(12) United States Patent     (10) Patent No.:   US 12,620,925 B2
Perret     (45) Date of Patent:     May 5, 2026

(54) PHOTOVOLTAIC INSTALLATION

(71) Applicant: PLANAIR SA, La Sagne (CH)

(72) Inventor: Lionel Perret, Neuchâtel (CH)

(73) Assignee: PLANAIR SA, La Sagne (CH)

( * ) Notice: Subject to any disclaimer, the term of this patent is extended or adjusted under 35 U.S.C. 154(b) by 0 days.

(21) Appl. No.: 18/705,315

(22) PCT Filed: Aug. 18, 2022

(86) PCT No.: PCT/IB2022/057755
§ 371 (c)(1),
(2) Date: Apr. 26, 2024

(87) PCT Pub. No.: WO2023/073443
PCT Pub. Date: May 4, 2023

(65) Prior Publication Data
US 2025/0047229 A1     Feb. 6, 2025

(30) Foreign Application Priority Data
Oct. 27, 2021    (CH) ................................... 070453/21

(51) Int. Cl.
*H02S 20/21*       (2014.01)
*F03D 80/50*       (2016.01)
(52) U.S. Cl.
CPC ............ *H02S 20/21* (2014.12); *F03D 80/507* (2023.08)
(58) Field of Classification Search
None
See application file for complete search history.

(56) References Cited

U.S. PATENT DOCUMENTS

| | | | |
|---|---|---|---|
| 8,564,147 B1 | 10/2013 | Sharp | |
| 2011/0315192 A1 | 12/2011 | Swatek et al. | |
| 2017/0152837 A1 | 6/2017 | Anemaat et al. | |
| 2018/0294769 A1 | 10/2018 | Stoger et al. | |
| 2021/0126574 A1* | 4/2021 | Duggal | .................... E01C 1/00 |

FOREIGN PATENT DOCUMENTS

| | | | |
|---|---|---|---|
| CN | 104113271 A | 10/2014 | |
| CN | 108809215 A | 11/2018 | |
| CN | 110154274 A | 8/2019 | |
| DE | 202009002259 U1 | 6/2009 | |
| EP | 3462605 A1 * | 4/2019 | ............. E01F 11/00 |
| KR | 20140115558 A | 10/2014 | |
| WO | 2008088311 A2 | 7/2008 | |
| WO | 2015051926 A1 | 4/2015 | |

(Continued)

OTHER PUBLICATIONS

Goodman, "Architectonic Reuse of Wind Turbine Blades", May 2010, SOLAR 2010 Ases Conference, Phoenix, AZ, 8 pages.

(Continued)

*Primary Examiner* — Eli S Mekhlin
(74) *Attorney, Agent, or Firm* — Blank Rome LLP

(57) ABSTRACT

The invention relates to a photovoltaic module (16) comprising at least one recycled blade of a horizontal axis wind turbine or a section of a recycled blade of a horizontal-axis wind turbine which forms a beam (25), characterised by a plurality of cross-members (26) secured to the beam (25), each cross-member bearing photovoltaic panels (18).

8 Claims, 3 Drawing Sheets

(56)        References Cited

FOREIGN PATENT DOCUMENTS

WO        2018137290  A1     8/2018
WO        2019246148  A1     12/2019

OTHER PUBLICATIONS

Manjeet Rani et al., "A review on recycling and reuse methods for
carbon fiber/glass fiber composites waste from wind turbine blades",
Composites Part B, Elsevier Ltd., Amsterdam, NL, vol. 215, avail-
able online Mar. 9, 2021, 15 pages.
Jelle Joustra et al., "Structural reuse of high end composite products:
A design case study on wind turbine blades", Resources, Conser-
vation & Recycling, Amsterdam, NL, vol. 167, available online Jan.
19, 2021, Elsevier B.V., 10 pages.
Larsen, "Recycling wind", Reinforcedplastics, Jan./Feb. 2009, Elsevier
Ltd., 6 pages.
International Search Report and Written Opinion of the Interna-
tional Searching Authority issued Nov. 9, 2022, in International
Application No. PCT/IB2022/057755, 12 pages (with partial Eng-
lish translation).

* cited by examiner

PHOTOVOLTAIC INSTALLATION

CROSS-REFERENCE TO RELATED APPLICATIONS

This application is a 371 of International Patent Application No. PCT/IB2022/057755, filed on Aug. 18, 2022, which claims the benefit of priority to Switzerland Patent Application No. 070453/21, filed on Oct. 27, 2021, the contents of which are incorporated herein by reference in their entirety.

TECHNICAL FIELD

The present invention relates to a modular system for the design, installation, production, modification and easy maintenance of photovoltaic systems, in particular, but not exclusively, close to roads and highways.

PRIOR ART

Photovoltaic installations are already of great importance and their numbers are ever increasing thanks, among other things, to the increasingly lower price of photovoltaic panels made of silicon. However, solar installations are still visually intrusive and take up large surface areas. Apart from roofs, it is difficult to find locations that can accommodate new installations.

Also known are installations for converting the kinetic energy of the wind into electrical energy. Those currently most widespread are horizontal-axis wind turbines which generally comprise a nacelle positioned at the top of a mast. The nacelle can rotate according to the wind direction at any given time and supports a turbine that the wind turns about a horizontal axis. These structures can reach considerable sizes, and the blades of more powerful turbines these days have lengths of 80 meters or more.

What happens to these wind turbine blades at the end of their life is a global issue. Often, the blades are removed to make way for new, more efficient blades. Most blades are made of composites consisting of thermosetting resins and glass, aramid or carbon fibers which are not recyclable by the usual methods. The blades are generally treated as waste at the end of their service life. Methods for recycling these products are known, comprising for example thermolysis or solvolysis of the thermosetting matrix to recover the fibrous component. However, these methods involve considerable energy and economic costs and result in a recycled product of poor quality.

Most often, wind turbine blades at the end of their life are incinerated, with the emission of pollutants and microparticles, or sometimes, in the absence of economical methods for grinding or crushing them, simply buried in landfills. Several countries are banning or are considering banning this practice.

Old, unused blades represent a significant cost as the only non-recyclable component of a wind turbine. There is therefore a need for an efficient and economical way of reusing these products.

BRIEF SUMMARY OF THE INVENTION

One of several aims of the present invention is to propose a photovoltaic system that can be adapted to a wide variety of installation sites.

Another aim of the invention is to propose a reuse of wind turbine blades at the end of their life to prevent them from becoming waste. This aim may be combined with others, or be independent.

According to the invention, these aims are achieved in particular by means of the subject matter of the attached claims, and in particular by a photovoltaic module comprising at least one reused horizontal-axis wind turbine blade or reused horizontal-axis wind turbine blade section forming a beam, characterized by a plurality of cross-members secured to the beam, each cross-member carrying photovoltaic panels.

The dependent claims introduce features that are useful, advantageous or desirable, but not essential. They relate for example to the fact that the cross-members are secured to the beam at a right angle in their middle, or that they extend away from the beam at an acute angle, each cross-member may carry a double row of photovoltaic panels and may comprise a clamping structure in the middle thereof, configured to clamp the wind turbine blade or the wind turbine blade section forming the beam on the upper surface and on the lower surface. The modules may be supported in a horizontal position by a vertical pillar at one end and preferably by a secondary pillar supporting the second opposite end.

The modules of the invention may be put to several uses. One noteworthy example is a "solar highway" comprising a plurality of horizontal photovoltaic modules placed one after the other along a road, the pillars of each module being installed on two opposite sides of the road, such that each module forms a bridge spanning the road.

In some embodiments, the invention makes use of reused wind turbine blades. Unlike recycling, which allows materials from end-of-life products to be reintroduced into the manufacture of new products, reuse preserves the structure of the product while putting it to a different use. In the context of the invention, this includes aerodynamic structures designed for use in a wind turbine rotor which are put to another use after the initial use. Reused blades also include new products that have never been used for the initially intended application, either because they do not meet specifications or for other reasons. Reuse (also called repurposing) does not require grinding or crushing of the original product, but may include some preparation and processing steps, for example cutting, painting, drilling, assembly, and the like. In the context of the invention, either whole blades or sections of blades cut to the desired length may for example be used.

When it is stated that the photovoltaic modules are "flat" or lie in a plane, this does not mean that the modules are contained in an ideal geometric plane, but that their arrangement is essentially planar, while allowing for the inevitable deformations due to the flexibility of the materials. Horizontal-axis wind turbine blades have the capacity to withstand very great static and dynamic loads and are well able to support a large surface area of solar panels. However, they are elastic structures which can develop considerable deflection under load. Given their large dimensions, these deformations are modest.

BRIEF DESCRIPTION OF THE FIGURES

Examples of implementation of the invention are set out in the description illustrated by the attached figures, in which.

EXAMPLE(S) OF EMBODIMENTS OF THE INVENTION

Figures 1, 2, 3:
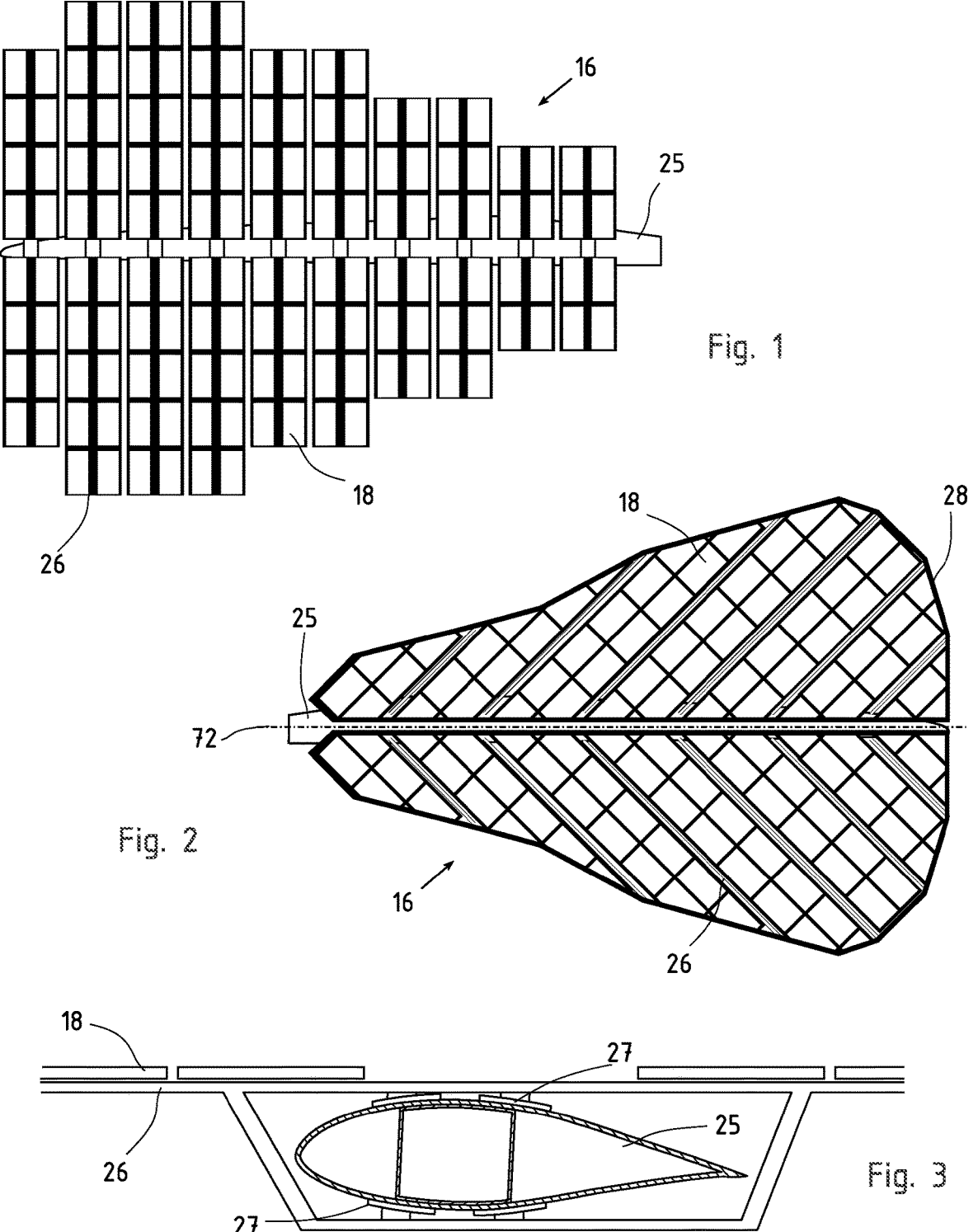
FIGS. 1 and 2 show an arrangement of the photovoltaic module of the invention on a reused horizontal-axis wind turbine blade.
FIG. 3 shows a possible embodiment of the connection between a horizontal-axis wind turbine blade and the photovoltaic module of the invention.

According to the invention, the photovoltaic modules 16 are planar structures comprising several photovoltaic panels as shown in FIG. 1. The solar panels 18 are preferably bifacial so as to collect, in addition to direct solar radiation, also the scattered light coming from below. Each module comprises at least one support beam 25 which is a reused horizontal-axis wind turbine blade, or a horizontal-axis wind turbine blade section.

FIG. 1 shows an arrangement of the photovoltaic panels in a photovoltaic module. In this variant, the blade 25 carries a plurality of cross-members 26 which intersect it at right angles in their middle and are regularly distributed along the length. Each cross-member 26 is secured to the blade 25, for example by structures 27 which clamp the blade 25, bearing on the upper surface and on the lower surface, as shown in FIG. 3. The cross-members extend symmetrically from both sides of the blade 25. The clamping geometry will be designed according to the internal structure of the wind turbine blade 25, in particular in relation to the position of the internal reinforcements of the blade 25 (shown schematically in section).

Each cross-member is equipped with a double row of photovoltaic modules 18. Advantageously, the cross-members 26 are independent of one another, and can follow the inevitable flexions of the blade 25 without transmitting dangerous forces to the panels 18.

FIG. 2 shows a variant of the modules 16 which also comprises a single beam 25 together with cross-members 26. The cross-members in this variant extend away from the longitudinal axis 72 of the beam at an acute angle. The invention also includes variants, not shown, with several beams in each module 16. The beams may be arranged parallel, in a "V", or in any suitable arrangement and may comprise one or more wind turbine blades or wind turbine blade sections. The wind turbine blades may also participate in the construction of the cross-members 26 or the frame 28.

Examples of use of the photovoltaic modules 16 of the invention will be set out below, in which the beam 25 and the cross-members 26 lie essentially horizontally. The invention is not limited to this arrangement, however.

Figures 4, 5, 6:
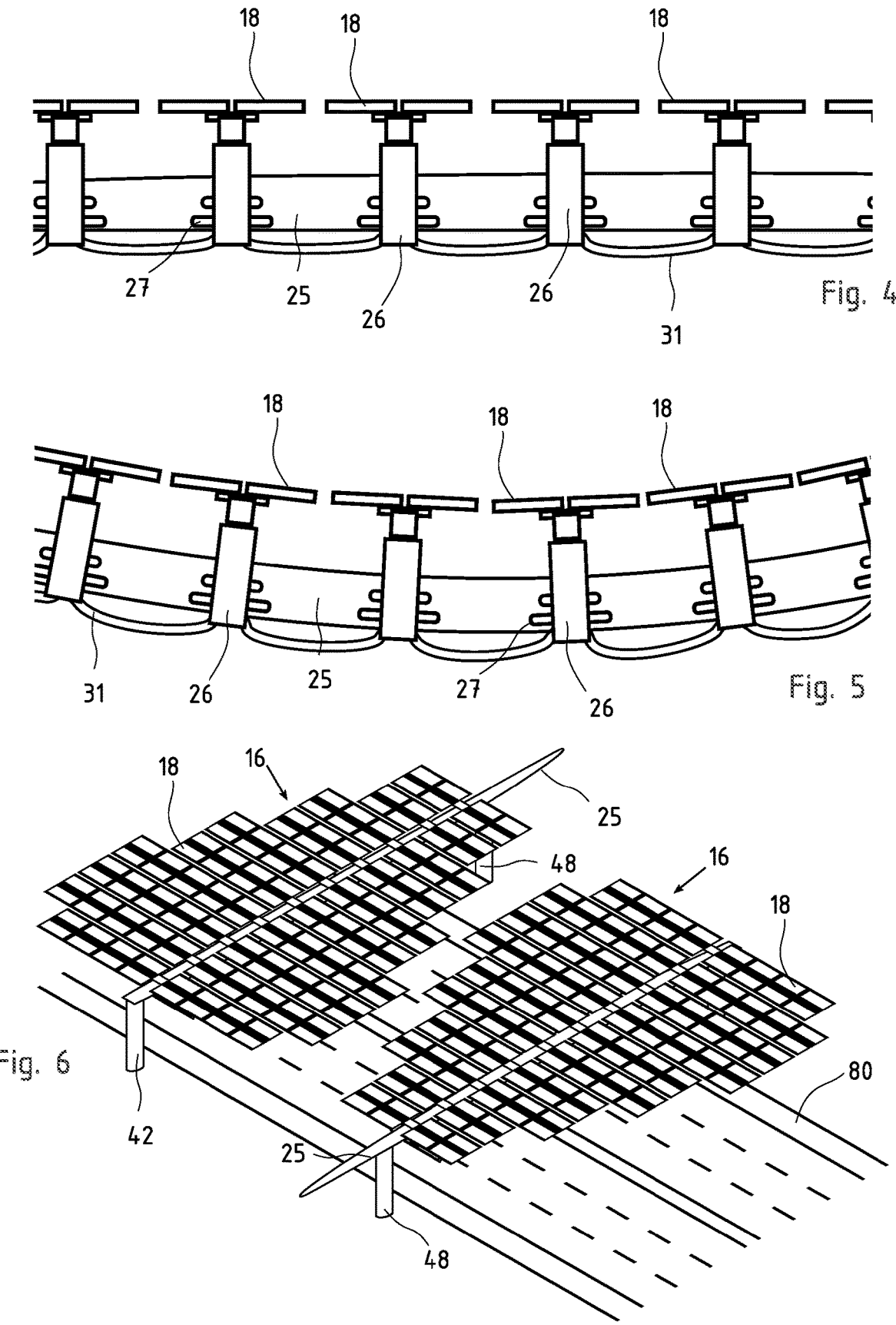
FIGS. 4 and 5 show part of a photovoltaic module of the invention in a non-loaded situation and in deflection, respectively.
FIGS. 6 and 7 schematically show a use of the photovoltaic modules of the invention in a solar park along a highway and along a railroad line, respectively.

As mentioned above, it is preferable for the cross-members 26 to be independent of one another so as to be able to follow the flexions of the wind turbine blade 25. FIG. 4 shows part of a photovoltaic module according to the invention in which the beam formed by the blade 25 is not deformed. The photovoltaic panels 18 lie essentially in the same horizontal plane. The clamping pads 27, which secure each of the cross-members 26 to the blade 25 independently, can be seen. The power line 31 comprises flexible cables and transmits the electrical energy produced by the photovoltaic panels 18 to one end of the module.

Figure 7:
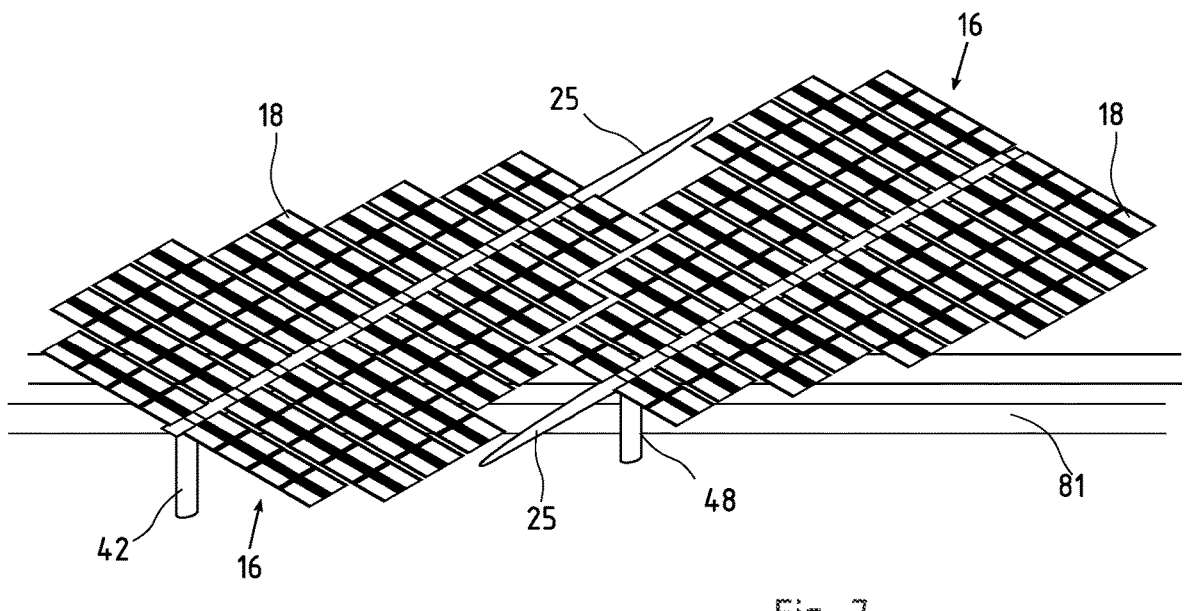

FIG. 5 shows the same photovoltaic module with the beam 25 considerably deformed. The figure is not to scale. Deformations and deflections are exaggerated to make them more visible. The overall curvature of the wind turbine blade 25 moves the photovoltaic panels 18 out of the nominal plane. Because the cross-members are independent, no mechanical force is transmitted to the panels. The empty spaces between the rows of panels are dimensioned according to the maximum expected deformations so as to avoid any impact between the panels. FIG. 7 shows a deformation having an upward concavity, such as is expected when the beam 25 is placed between two supports, but the photovoltaic modules of the invention can also withstand deformations having a downward concavity, if the beam 25 is supported in a cantilever, as well as more complex deformations, for example twisting.

FIG. 6 shows a photovoltaic installation according to the present invention in which a plurality of photovoltaic modules is arranged one after the other along a communication route, for example a major road or a highway 80. Communication routes often offer desirable conditions for such photovoltaic installations: sunlight conditions are generally favorable and access is excellent. In addition, roads are often lined with power lines making it possible to distribute energy that cannot be used on site. The figures show approximately triangular photovoltaic modules in an alternating arrangement to maximize coverage, but other arrangements are possible.

The modules are supported by a main pillar 42 at one end and, preferably, by an auxiliary pillar 48 positioned further along the beam 25. Advantageously, the beam 25 may be bolted to the main pillar via the root (not shown) originally provided to connect the blade to the hub of a wind turbine. The main pillar 42 and the auxiliary pillar 48 are installed on two opposite sides of the road, such that the photovoltaic module 16 spans the road horizontally and the vehicles pass over it. In addition to the production of solar power, the modules of the invention can support road signs, surveillance cameras, or any other device useful for the management and control of the road and traffic.

As shown in FIG. 7, the photovoltaic modules 16 of the invention may also be arranged along other communication routes, for example railroads 81, with the same advantages as roads and highways. Depending on the width and the structure to be covered, the modules may be installed orthogonally, or diagonally as shown here. The communication routes to which this variant of the invention is applicable also include canals and navigable watercourses.

Furthermore, the modules 16 may also be arranged along rivers, waterways, streams, aqueducts, irrigation canals, pipelines for the transport of gas, oil, penstocks, etc.

The photovoltaic modules 16 of the invention may also serve as a barrier for concealing traffic, attenuating noise, and protecting from the sun and rain. It goes without saying that the same installation, or similar installations, may be applied to other open spaces such as reservoirs, walking paths, car parks, sports facilities, train stations, urban spaces and the like.

REFERENCE NUMERALS USED IN THE FIGURES

16 photovoltaic module
18 photovoltaic panels
25 reused wind turbine blade, beam
26 rib
27 clamping means
28 frame
31 cables
42 main pillar
48 auxiliary pillar
72 longitudinal axis of the beam
80 highway
81 railroad

The invention claimed is:

1. A photovoltaic module comprising at least one reused horizontal-axis wind turbine blade or reused horizontal-axis wind turbine blade section forming a beam, a plurality of cross-members secured to the beam by clamping structures that clamp on the wind turbine blade on an upper surface and on a lower surface thereof, each cross-member carrying photovoltaic panels, wherein the cross-members are independent of one another and photovoltaic panels carried by adjacent cross-members are separated by empty spaces, and the clamping structures that clamp on the wind turbine blade being placed above and below an internal reinforcement of the wind turbine blade.

2. The photovoltaic module as claimed in claim 1, wherein the cross-members are secured to the beam at a right angle in their middle, each cross-member carrying a double row of photovoltaic panels.

3. The photovoltaic module as claimed in claim 1, wherein the clamping structures are in the middle of each cross-member.

4. The photovoltaic module as claimed in claim 1, comprising a first vertical pillar on which a first end of the beam bears, and a secondary pillar supporting a second end of the beam, such that the beam, the cross-members and the photovoltaic panels lie in the same horizontal plane.

5. A photovoltaic installation comprising a plurality of horizontal photovoltaic modules as claimed in claim 4, installed along a communication route, or a watercourse, wherein the photovoltaic modules are arranged with the beam orthogonal to the communication route or the watercourse.

6. A photovoltaic module comprising at least one reused horizontal-axis wind turbine blade or reused horizontal-axis wind turbine blade section forming a beam, a plurality of cross-members secured to the beam, each cross-member carrying photovoltaic panels, wherein the cross-members are independent of one another and photovoltaic panels carried by adjacent cross-members are separated by empty spaces dimensioned such that no mechanical force is transmitted to the panel when the wind turbine blade is deformed to a predefined maximum expected deformation.

7. The photovoltaic module of claim 6, the deformation comprising bending and twisting components.

8. The photovoltaic module of claim 6, the cross-member meeting the beam at a straight angle and extending symmetrically from both sides of the beam.

* * * * *